(12) United States Patent
Santana, Jr. et al.

(10) Patent No.: US 7,022,976 B1
(45) Date of Patent: Apr. 4, 2006

(54) DYNAMICALLY ADJUSTABLE PROBE TIPS

(75) Inventors: Miguel Santana, Jr., Buda, TX (US); Robert Powell, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 207 days.

(21) Appl. No.: 10/405,295

(22) Filed: Apr. 2, 2003

(51) Int. Cl.
*B23Q 17/09* (2006.01)
*G01N 19/02* (2006.01)
*G01B 5/28* (2006.01)

(52) U.S. Cl. .......................... 250/234; 73/104; 73/105
(58) Field of Classification Search ................. 73/105, 73/104; 250/234; 324/754–756
See application file for complete search history.

(56) References Cited

U.S. PATENT DOCUMENTS

| | | | | |
|---|---|---|---|---|
| 3,345,567 | A * | 10/1967 | Turner et al. ............... | 324/762 |
| 3,437,929 | A * | 4/1969 | Glenn ........................ | 324/759 |
| 3,611,128 | A * | 10/1971 | Nagata ...................... | 324/72.5 |
| 4,267,507 | A * | 5/1981 | Guerpont ................... | 324/754 |
| 4,568,879 | A * | 2/1986 | Nakamura et al. .......... | 324/759 |
| 4,883,959 | A * | 11/1989 | Hosoki et al. ............. | 250/306 |
| 5,948,972 | A * | 9/1999 | Samsavar et al. ........... | 73/105 |
| 6,159,742 | A | 12/2000 | Lieber et al. ............... | 436/164 |
| 6,189,374 | B1 | 2/2001 | Adderton et al. ........... | 73/105 |
| 6,346,189 | B1 | 2/2002 | Dai et al. ................... | 205/766 |
| 6,401,526 | B1 | 6/2002 | Dai et al. ................... | 73/105 |
| 6,457,350 | B1 | 10/2002 | Mitchell .................... | 73/105 |
| 6,686,993 | B1 * | 2/2004 | Karpman et al. ......... | 356/237.1 |
| 6,708,556 | B1 * | 3/2004 | Kim et al. .................. | 73/105 |

OTHER PUBLICATIONS

Stephen C. Minne et al.; *Bringing Scanning Probe Microscopy Up to Speed*; Feb. 1999; pp. 141-157.

Quate Group, Stanford University; *Piezoresistive Introduction*; http://www.standford.edu/group/quate_group/Home/HomePages/Presentations/Basic.PDF; Nov. 17, 1998; pp. all.

H. T. Soh; *Integrated Synthesis of Carbon Nanotubes*; http://www.stanford.edu/group/quate_group/Home/HomePages/Presentations/nanotube.PDF; Quate Group, Stanford University; Nov. 23, 1998; pp. all.

H. T. Soh; *Electrical Contacts to Carbon Nanotubes*; http://www.standford.edu/group/quate_group/Home/HomePages/Presentations/nanotube_local.PDF; Nov. 23, 1998; pp. all.

NanoDevices, Inc.; *Active Probe*; http://www.nanodevices.com/activeprobe.html; Nov. 18, 2002; pp. all.

* cited by examiner

*Primary Examiner*—Hezron Williams
*Assistant Examiner*—Tamiko Bellamy
(74) *Attorney, Agent, or Firm*—Timothy M. Honeycutt

(57) ABSTRACT

Various probe systems and probes are provided. In one aspect, a probe is provided that includes a base and a first member coupled to the base. The first member has a first tip for probing a circuit device. A first actuator is coupled to the first member for moving the first member relative to the base. Electrical and/or topographical probing is possible.

21 Claims, 3 Drawing Sheets

DYNAMICALLY ADJUSTABLE PROBE TIPS

BACKGROUND OF THE INVENTION

1. Field of the Invention

This invention relates generally to semiconductor processing, and more particularly to electrical and/or atomic force microscopy probe systems.

2. Description of the Related Art

Atomic force microscopy ("AFM") generally involves scanning a stylus or probe across a microscopic topography, such as an integrated circuit structure, and sensing the forces exerted on the stylus. The stylus is provided with a small geometry tip that physically contacts the surface topography. The tip may be made from conducting or semiconducting materials that enable various types of circuits to be electrically as well as topographically probed.

The technique has been widely used in metrology of structures in photoresist, interlevel dielectric layers, sidewall angles, trench depths and surface morphology. The scanning resolution of the probe is dependent on the radius of curvature of the probe tip that contacts a given topographical feature.

In conventional AFM machines, the probe tip is part of or otherwise fastened to a cantilever that is, in turn, coupled to a base. The base is fitted to a piezo actuator that is operable to move the base, and thus the cantilever along three axes of movement. The piezo actuator is coupled to a moveable carriage that is operable to provide large scale movements of the base, on the order of tens of millimeters. These large scale movements are necessary to bring the probe tip into proximity with an area of interest on an integrated circuit. More refined movements to bring the tip into contact with the integrated circuit at a specific location are accomplished with the piezo actuator. Conventional piezo actuators have a range of movement of a little less than 100 microns.

Currently produced integrated circuits often have millions of circuit structures compressed into a very small footprint. Despite this dense packing, it is often desirable to probe several circuit structures at the same time. For example, in order to probe the behavior of a field effect transistor, it is desirable to be able to simultaneously probe contacts leading to the source/drains and gate of the transistor. Depending upon the minimum device geometry of the integrated circuit, the spacing between the contacts may be less than a micron.

Although conventional probe cantilevers are themselves relatively small devices, the conventional hardware to hold and position them is not. A conventional piezo actuator and the carriage that holds it typically dwarf current integrated circuits. Furthermore, relative to the sizes of probed structures on integrated circuits, conventional probe cantilevers may also be characterized as large indeed. As a result, it is difficult to position more than one conventional cantilever/probe tip proximate an integrated circuit. In circumstances where closely spaced structures require probing, such as the source/drains and gate referred to above, it may be very difficult to successfully position multiple conventional probe tips proximate the targeted circuit structures.

Unless the trend toward increasing miniaturization of integrated circuits that has prevailed since the early days of semiconductor fabrication somehow reverses in the future, the problems associated with probing micro circuit structures just noted will become even more challenging.

The present invention is directed to overcoming or reducing the effects of one or more of the foregoing disadvantages.

SUMMARY OF THE INVENTION

In accordance with one aspect of the present invention, a probe is provided that includes a base and a first member coupled to the base. The first member has a first tip for probing a circuit device. A first actuator is coupled to the first member for moving the first member relative to the base.

In accordance with another aspect of the present invention, a probe is provided that includes a base and a first member coupled to the base. The first member has a first tip for probing a circuit device. A second member is coupled to the base. The second member has a second tip for probing the circuit device. The first and second members are configured such that the first and second tips have substantially the same spatial relationship as two circuit structures of interest on the circuit device.

In accordance with another aspect of the present invention, a probe system is provided that includes a base and a first member coupled to the base. The first member has a first tip for probing a circuit device. A first actuator is coupled to the first member for moving the first member relative to the base. An instrument is coupled to the base. The instrument is operable to sense responses when the first probe tip encounters the circuit device.

In accordance with another aspect of the present invention, a probe system is provided that includes a base and a first member coupled to the base. The first member has a first tip for probing a circuit device. A second member is coupled to the base. The second member has a second tip for probing the circuit device. The first and second members are configured such that the first and second tips have substantially the same spatial relationship as two circuit structures of interest on the circuit device. An instrument is coupled to the base. The instrument is operable to sense responses when one or both of the first and second probe tips encounters the circuit device.

BRIEF DESCRIPTION OF THE DRAWINGS

The foregoing and other advantages of the invention will become apparent upon reading the following detailed description and upon reference to the drawings in which.

DETAILED DESCRIPTION OF SPECIFIC EMBODIMENTS

Figure 1:
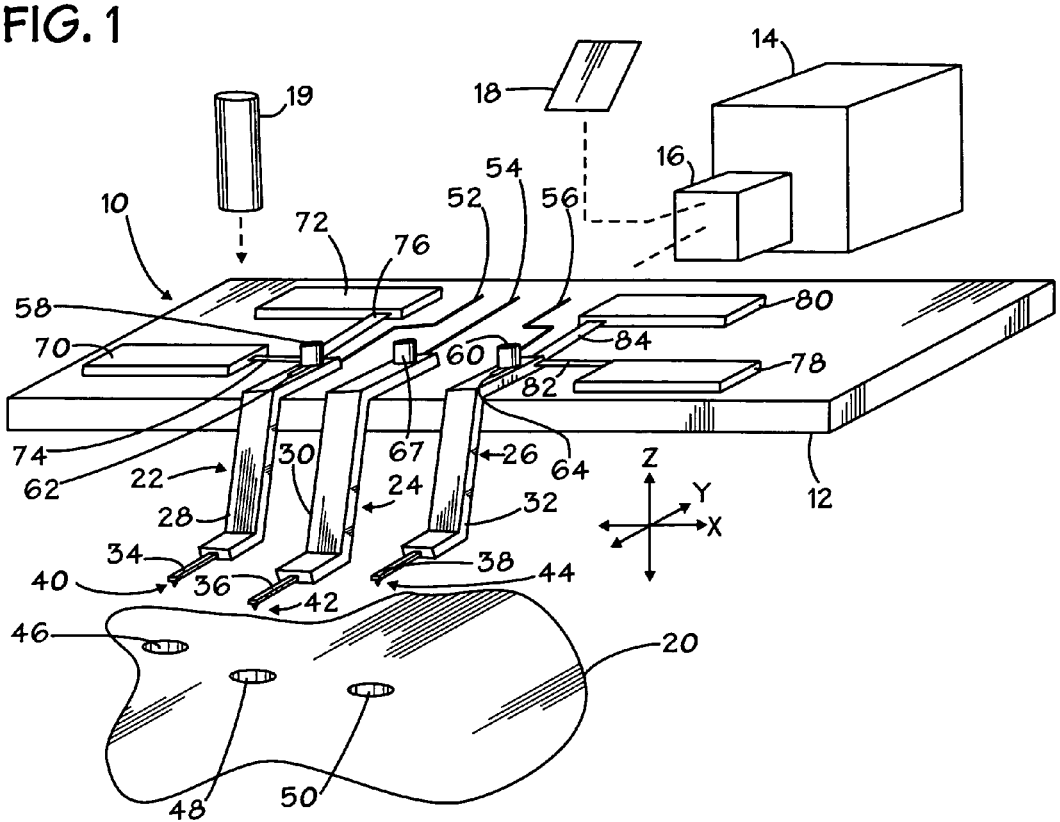
FIG. 1 is a partially exploded pictorial view of an exemplary embodiment of a probe system in accordance with the present invention.
Figure 2:
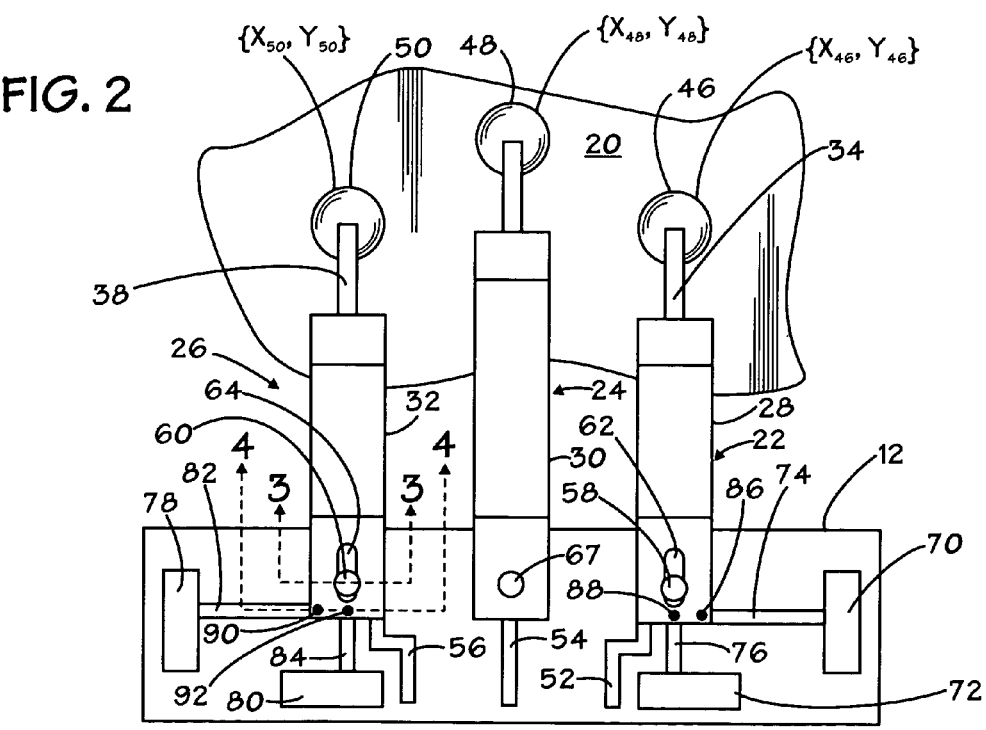
FIG. 2 is a plan view of the probe system of FIG. 1 in accordance with the present invention.

In the drawings described below, reference numerals are generally repeated where identical elements appear in more than one figure. Turning now to the drawings, FIGS. 1 and 2 depict a partially exploded pictorial view and a plan view of an exemplary embodiment of a probe system 10 that may utilize atomic force microscopy ("AFM") in accordance with the present invention. The system 10 includes a base or cartridge 12 that is used in conjunction with an instrument 14. The instrument 14 is provided with an actuator 16 that engages the cartridge 12. A mirror 18 is coupled to the actuator 16. The instrument 14 is shown exploded from the cartridge 12 and the mirror 18 is shown exploded from the actuator 16. A laser source 19 is provided to illuminate selected portions of the cartridge 12. Light is reflected back up the mirror 18 and from there into the instrument. The function of the mirror 18 and laser source 19 will be described in more detail below.

The probe system 10 is designed to provide for electrical and topographical probing of a circuit device 20, a portion of which is depicted in FIG. 1. Topographical probing may be by AFM for example, or other imaging techniques that facilitate probe placement for electrical or other testing. To this end, the cartridge 12 is provided with one or more members or cantilevers 22, 24 and 26. The members 22, 24 and 26 consist of respective arms 28, 30 and 32 that are coupled at one end to the cartridge 12. The arms 28, 30 and 32 are provided with respective elongated members 34, 36 and 38 that are, in turn, provided with downwardly projecting sharpened probe tips, 40, 42 and 44.

The members 22, 24 and 26, and the base 12 may be fabricated from a variety of materials suitable for AFM or other probes, such as, for example, silicon, silicon nitride, silicon oxynitride, laminates of these or the like. Optionally, various metals may be used, such as gold, platinum or the like may be used. The tips 40, 42 and 44 may be fabricated from a variety of materials. For example, silicon that has been sharpened through one or more oxidation and etching steps or ion machining may be used. Other well-known materials may be used as well, such as metals, e.g., tungsten or the like.

Through manipulation of various actuators to be described in more detail below, the probe tips 40, 42 and 44 are brought into engagement with various portions of the circuit device 20 for the purposes of electrical probing, topographical probing, or a combination of the two. For example, the tips 40, 42 and 44 may be brought into engagement to scan and locate the circuit structures 46, 48 and 50 and thereafter electrically probe those structures as desired. The circuit structures 46, 48 and 50 are depicted as vias. However, the skilled artisan will appreciate that virtually any type of circuit structure may be examined with the system 10.

To enable the members 22, 24 and 26 to electrically probe the circuit structures 46, 48 and 50, an electrical pathway is provided from the probe tips 40, 42 and 44 to respective conductors 52, 54 and 56 on the cartridge 12. The conductors 52, 54 and 56 may be conductor traces, wires or other conductor structures. As described more fully below, the connection between the conductors 52, 54 and 56 and the respective members 22, 24 and 26 should accommodate the movements of the members 22, 24 and 26. An exemplary structure for accommodating that sliding contact will be described below in conjunction with FIGS. 2 and 4. The conductors 52, 54 and 56 may interface with one or more electrical leads in the instrument or the actuator 16 as desired.

The actuator 16 provides for movement of the cartridge 12 along the X, Y and Z-axes. The actuator 16 may be implemented as a piezo actuator, microelectromechanical system, commonly known as "MEMS" or other well-known devices capable of causing controlled movement of the base 12. As the skilled artisan will appreciate, MEMS devices may be implemented as a myriad of mechanical elements, such as cams and followers, crank-rockers, geared arrangements, and linear electric motors to name just a few.

Figure 3:
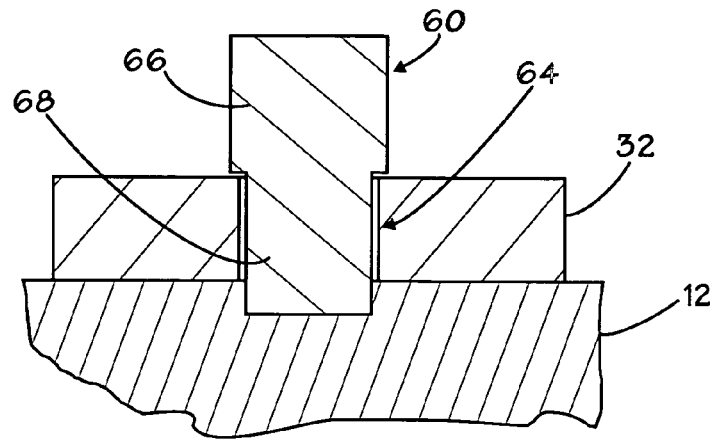
FIG. 3 is a sectional view of FIG. 2 taken at section 3—3 in accordance with the present invention.

In addition, the members 22 and 26 are movable relative to the base 12. In this regard, the members 22 and 26 may be pivotally secured to the cartridge 12 by way of pins 58 and 60 and corresponding slots 62 and 64 in the arms 28 and 32. Of course, other well-known connection techniques may be used in lieu of pins. As better seen in FIG. 2 and FIG. 3, which is a sectional view of FIG. 2 taken at section 3—3, the pin 60 has an upper portion 66 that is enlarged relative to a lower portion 68 which projects down through the slot 64. This permits a sliding and pivoting movement of the arm 32. The pin 60 may be secured to the cartridge 12 by any of a variety of known fastening techniques, such as adhesives, friction fitting, threaded connections or the like. The skilled artisan will appreciate that other fastening methods may be used to secure the members 22 and 26 to the base 12. In the illustrated embodiment, the members 22 and 26 are moveable in the X-Y plane. However, other movements schemes are envisioned. The member 24 may be coupled to the base 12 by way of a pin 67 or other structure. The member 24 may be stationary as depicted or alternatively moveable like the members 22 and 26.

Figure 4:
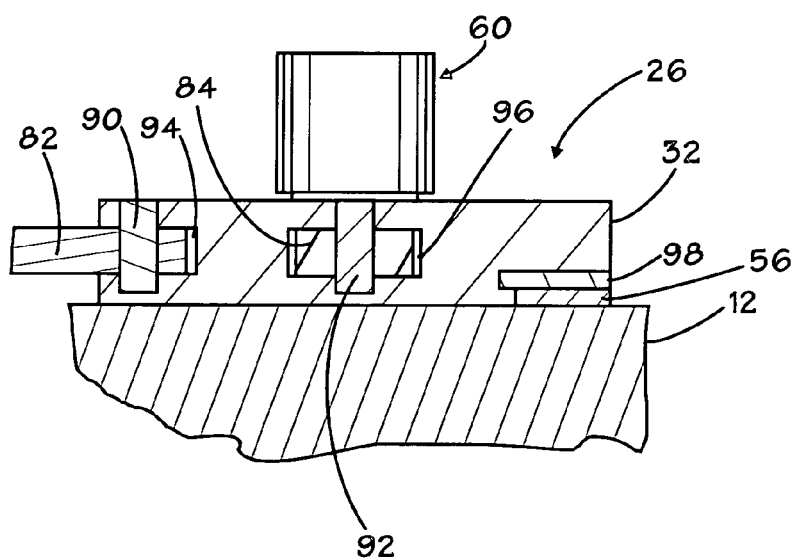
FIG. 4 is a sectional view of FIG. 2 taken at section 4—4 in accordance with the present invention.

Referring again to FIGS. 1 and 2, the selective movement of the member 22 is provided by actuators 70 and 72 that are mechanically coupled to the member 22 by members 74 and 76. The member 26 is provided with a complementary set of actuators 78 and 80 that are coupled to the member 26 by members 82 and 84. As better seen in FIG. 2 and FIG. 4, which is a sectional view of FIG. 2 taken at section 4—4, the members 74 and 76 are pivotally connected to the member 22 by way of pins 86 and 88. The members 82 and 84 are similarly connected to the member 26 by way of pins 90 and 92. As shown in FIG. 4, the pin 90 pivotally holds the member 82 in a cut out 94 in the arm 32. The pin 92 similarly holds the member 84 in a cut out 96 in the arm 32. Of course, other well-known connection techniques may be used in lieu of pins.

As noted briefly above, it may be desirable to provide an electrical continuity between the probe tips 40, 42 and 44 and the conductors 52, 54 and 56. One exemplary embodiment for establishing this electrical continuity is depicted in FIG. 4. The arm 32 is provided with a conductor 98 that is operable to maintain sliding conducting contact with the conductor 56. In this way, when the arm 32 is moved relative to the base 12 by way of the actuators 78 and 80, sliding electrical contact is maintained between the conductor 98 and the conductor 56. The conductor 98 extends down to the member 38 and possibly to the tip 44 in the event that the member 38 is non-conducting. The skilled artisan will appreciate that a variety of structural techniques may be used to provide for electrical continuity between the arm 32 and the conductor 56 that accommodates pivoting movement of the arm 32. For example, a flexible bonding wire may be used to connect the conductor 56 to the arm 32.

The operation of the system 10 will now be described in conjunction with FIGS. 1 and 2. An image of the circuit device 20 is first acquired. The actuator 16 is instructed, by the instrument 14 other control system, to move the cartridge 12 appropriately to bring one or more of the probe tips 40, 42 or 44 into contact with the circuit device 20. The stationary member 24 and the corresponding probe tip 42 may be the more desirable target for the laser source 19. At this point, the laser source 19 is activated to illuminate a spot on the upper surface of the member 36. Thereafter, the actuator 16 is instructed to sweep the cartridge 12, and thus the probe tip 42, across the surface of the circuit device 20 according to a preselected scan area, which will ordinarily have a size that is dictated by the permissible range of movements of the actuator 16. As the probe tip 42 is scanned across the surface of the circuit device 20, the radiation from the laser source 19 reflects off the member 36 and is directed by the mirror 18 into the instrument 14. The instrument 14 interprets the reflected radiation and creates therefrom an image of the scanned area of the circuit device 20. In those circumstances where the probe tip 42 encounters a topographical change, such as at the locations of the circuit structures 46, 48 and 50. The locations of those topography changes will be noted and included in the image created by the instrument 14.

The generated image of the scanned area may be correlated with a coordinate system to make subsequent navigation and analysis more convenient. For example, a rectangular coordinate system may be used and the circuit structures assigned coordinates respective coordinates $\{X_{46}, Y_{46}\}$, $\{X_{48}, Y_{48}\}$ and $\{X_{50}, Y_{50}\}$ Other coordinate systems may be used instead of rectangular coordinates.

After the test area is scanned physically by the probe tip 42, the actuator 16 may be instructed to return the cartridge 12 to a position where the probe tip 42 is positioned approximately over one of the circuit structures 46, 48 or 50, e.g., at coordinates $\{X_{46}, Y_{46}\}$, $\{X_{48}, Y_{48}\}$ or $\{X_{50}, Y_{50}\}$. At this point, one or more of the actuators 70, 72, 78 and 80 may be activated to provide very fine adjustments of the positions of the arms 22 and 26 to position the respective probe tips 40 and 44 above the circuit structures 46, 48 or 50 as the case may be. In the illustrated embodiment, the arms 22 and 26 may be moved by the actuators 70, 72, 78 and 80 in order to position the tips 40 and 44 above the circuit structures 46 and 50. The actuator 16 may then be activated to bring the probe tips 40, 42 and 44 downward into contact with the circuit structures 46, 48 and 50. At this point, electrical probing of the circuit structures 46, 48 and 50 and whatever circuitry may be connected thereto may be conducted. The electrical probing may be performed by the instrument 14 or another analytical tool as desired.

The instrument 14 or other analytical tool is designed to sense responses when the probe tips 40, 42 and 44 encounter the circuit device 20. This may include responses associated with mechanical contact, electrostatic attraction or repulsion, strain associated with bending, or changes in light reflection to name just a few.

In some circumstances it may be useful to fabricate a probe tip cartridge with arms sized and positioned to hold the respective probe tips in a preselected orientation or spatial relationship that matches a pattern of circuit structures of interest on a circuit device. This may be useful in circumstances where a certain pattern of circuit structures is used often on the same device or on several devices. In this way, the cartridge functions much like a jig in a machining context.

Figure 5:
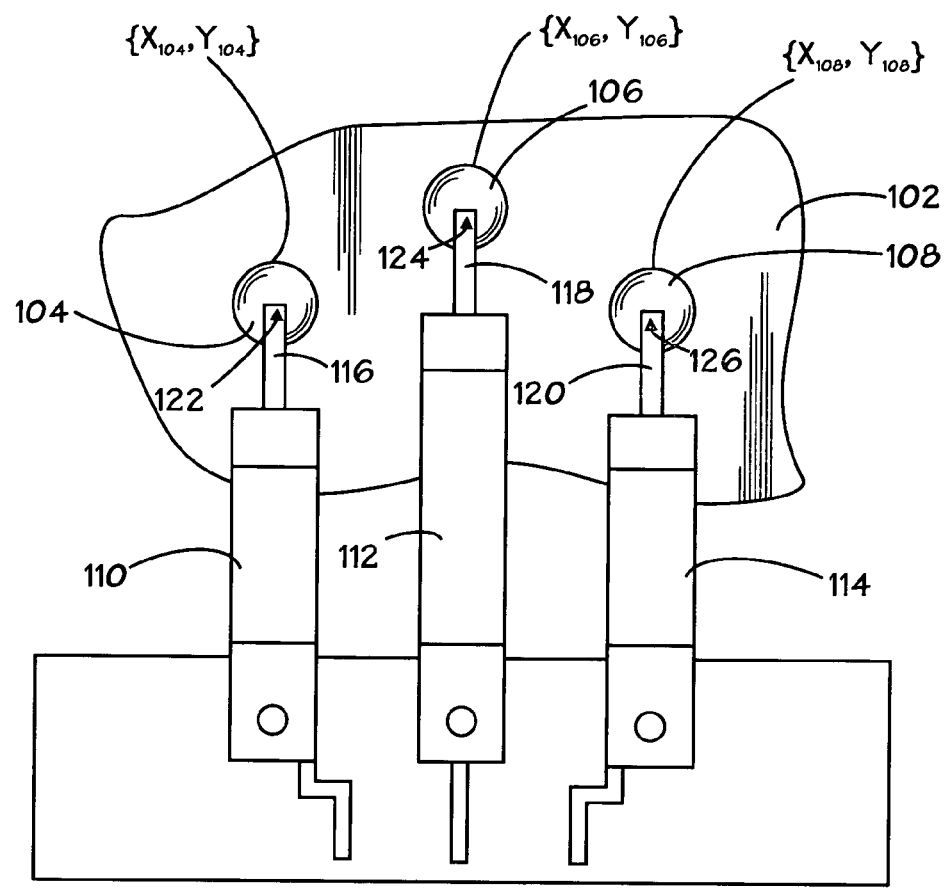
FIG. 5 is a plan view of an alternate exemplary embodiment of a microscopy probe in accordance with the present invention.

An exemplary embodiment of such a cartridge 100 is depicted in FIG. 5, which is a plan view. It is assumed for the purposes of this illustration, that a circuit device 102 includes circuit structures 104, 106 and 108 that are arranged in a predetermined pattern, that is the circuit structures have a predetermined spatial relationship. The predetermined pattern may be represented mathematically by a coordinate system in which the circuit structures 104, 106 and 108 have respective coordinates $\{X_{104}, Y_{104}\}$, $\{X_{106}, Y_{106}\}$ and $\{X_{108}, Y_{108}\}$. The cartridge 100 is fabricated so that the arms 110, 112, 114 coupled thereto are sized and positioned relative to one another such that their respective probe tips, not visible in FIG. 5 but positioned beneath the respective members 116, 118 and 120 at the locations represented by the arrows 122, 124 and 126 will have the same relative spatial orientation as the circuit structures 104, 106 and 108. In other words, the probe tips will have substantially the same spatial coordinates, e.g., $\{X_{104}, Y_{104}\}$, $\{X_{106}, Y_{106}\}$ and $\{X_{108}, Y_{108}\}$ as the circuit structures 104, 106 and 108. In this way, the cartridge 100 may be positioned such that one of the arms 110, 112 or 114 is positioned appropriately relative to a corresponding circuit structure and the cartridge 110 may then be lowered to probe the circuit structures 104, 106 and 108 without the need to separately adjust the other arms 112 and 114. This will greatly speed the probing of repetitive patterns of circuit structures. Three members or arms 110, 112 and 114 are depicted. However, two or more may be used.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A probe, comprising:
   a base;
   a first member pivotally coupled to the base, the first member having a slot and a pin positioned therein to couple the first member to the base and a first tip for probing a circuit device; and
   a first actuator coupled to the first member for pivotally moving the first member relative to the base.

2. The probe of claim 1, wherein the first member comprises a cantilever.

3. The probe of claim 1, wherein the first member comprises an arm coupled to the base and a cantilever coupled to the arm, the first tip being coupled to the cantilever.

4. The probe of claim 1, comprising a second actuator coupled to the first member, the first and second actuators being operable to move the first member in a plane.

5. The probe of claim 4, wherein the first actuator is operable to move the first member along an axis and the second actuator is operable to move the first member about a pivot point.

6. The probe of claim 1, comprising a second member coupled to the base, the second member having a second tip for probing the circuit device.

7. The probe of claim 6, comprising a third actuator coupled to the second member for moving the second member relative to the base.

8. The probe of claim 7, comprising a fourth actuator coupled to the second member for moving the second member relative to the base.

9. A probe, comprising:
   a base;
   a first member pivotally coupled to the base, the first member having a slot and a pin positioned therein to couple the first member to the base and a first tip for probing a circuit device; and
   a second member pivotally coupled to the base, the second member having a second tip for probing the circuit device, the first and second members being positionable such that the first and second tips have substantially the same spatial relationship as two circuit structures of interest on the circuit device.

10. The probe of claim 9, comprising a third member coupled to the base, the third member having a third tip for probing the circuit device, the first, second and third members being positionable such that the first, second and third tips have substantially the same spatial relationship as three circuit structures of interest on the circuit device.

11. The probe of claim 9, comprising a first conductor electrically coupled to the first tip and a second electrical conductor electrically coupled to the second tip.

12. A probe system, comprising:
a base;
a first member pivotally coupled to the base, the first member having a slot and a pin positioned therein to couple the first member to the base and a first tip for probing a circuit device;
a first actuator coupled to the first member for pivotally moving the first member relative to the base; and
an instrument coupled to the base, the instrument being operable to sense responses when the first probe tip encounters the circuit device.

13. The probe system of claim 12, comprising a laser source for illuminating a portion of the first member.

14. The probe system of claim 13, comprising a mirror for directing light reflected from the first member into the instrument.

15. The probe system of claim 12, wherein the first member comprises a cantilever.

16. The probe system of claim 12, wherein the first member comprises an arm coupled to the base and a cantilever coupled to the arm, the first tip being coupled to the cantilever.

17. The probe system of claim 12, comprising a second actuator coupled to the first member, the first and second actuators being operable to move the first member in a plane.

18. The probe system of claim 17, wherein the first actuator is operable to move the first member along an axis and the second actuator is operable to move the first member about a pivot point.

19. The probe system of claim 12, comprising a second member coupled to the base, the second member having a second tip for probing the circuit device.

20. The probe system of claim 19, comprising a third actuator coupled to the second member for moving the second member relative to the base.

21. The probe system of claim 20, comprising a fourth actuator coupled to the second member for moving the second member relative to the base.

* * * * *